(12) United States Patent
Kim et al.

(10) Patent No.: US 12,355,578 B2
(45) Date of Patent: Jul. 8, 2025

(54) PACKET LEVEL REDUNDANCY IN DISTRIBUTED COMPUTING SYSTEMS

(71) Applicant: Microsoft Technology Licensing, LLC, Redmond, WA (US)

(72) Inventors: Daehyeok Kim, Redmond, WA (US); Jitendra Padhye, Redmond, WA (US); Shachar Raindel, Redmond, WA (US); Wei Bai, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 504 days.

(21) Appl. No.: 17/695,485

(22) Filed: Mar. 15, 2022

(65) Prior Publication Data

US 2023/0299895 A1 Sep. 21, 2023

(51) Int. Cl.
*H04L 1/1867* (2023.01)
*H04L 45/7453* (2022.01)

(52) U.S. Cl.
CPC .......... *H04L 1/189* (2013.01); *H04L 45/7453* (2013.01); *H04L 2212/00* (2013.01)

(58) Field of Classification Search
CPC .............................. H04L 1/89; H04L 45/7453
See application file for complete search history.

(56) References Cited

U.S. PATENT DOCUMENTS

| | | | | |
|---|---|---|---|---|
| 9,571,387 B1* | 2/2017 | Atlas | ................... | H04L 12/1877 |
| 10,554,425 B2* | 2/2020 | Kebler | ................ | H04L 12/1877 |
| 2011/0051727 A1* | 3/2011 | Cai | ........................ | H04L 45/24 |
| | | | | 370/390 |
| 2014/0241362 A1* | 8/2014 | Bosshart | ................. | H04L 45/74 |
| | | | | 370/392 |
| 2016/0277358 A1* | 9/2016 | Ambati | ............... | H04L 63/1466 |
| 2017/0163599 A1* | 6/2017 | Shen | ................... | H04L 12/4633 |
| 2017/0187569 A1* | 6/2017 | Shiraki | ................. | H04L 41/122 |
| 2018/0287935 A1* | 10/2018 | Wang | .................. | H04L 12/4625 |
| 2020/0274806 A1* | 8/2020 | Kim | .................... | H04L 43/0876 |
| 2023/0029167 A1* | 1/2023 | Neelakantamurthy | ...................... | H04W 12/72 |

OTHER PUBLICATIONS

"International Search Report and Written Opinion Issued in PCT Application No. PCT/US2023/010884", Mailed Date: Apr. 25, 2023, 11 Pages.

* cited by examiner

Primary Examiner — Melanie Jagannathan
(74) Attorney, Agent, or Firm — Han Gim; Newport IP, LLC

(57) ABSTRACT

Techniques of packet level redundancy in distributed computing systems are disclosed herein. In one example, upon receiving an original packet to be transmitted from a source host to an application executing at a destination host, the source host generates a duplicated packet based on the received original packet. The source host can then encapsulate the original and duplicated packets with first and second outer headers having first and second header values, respectively, and transmitting the original and the duplicated packets from the source host to the destination host via a first network path and a second network path in the computer network, respectively. Then, the transmitted original and duplicated packets can be de-duplicated at the destination host before providing the de-duplicated original and duplicated packets to the application executing at the destination host.

19 Claims, 10 Drawing Sheets

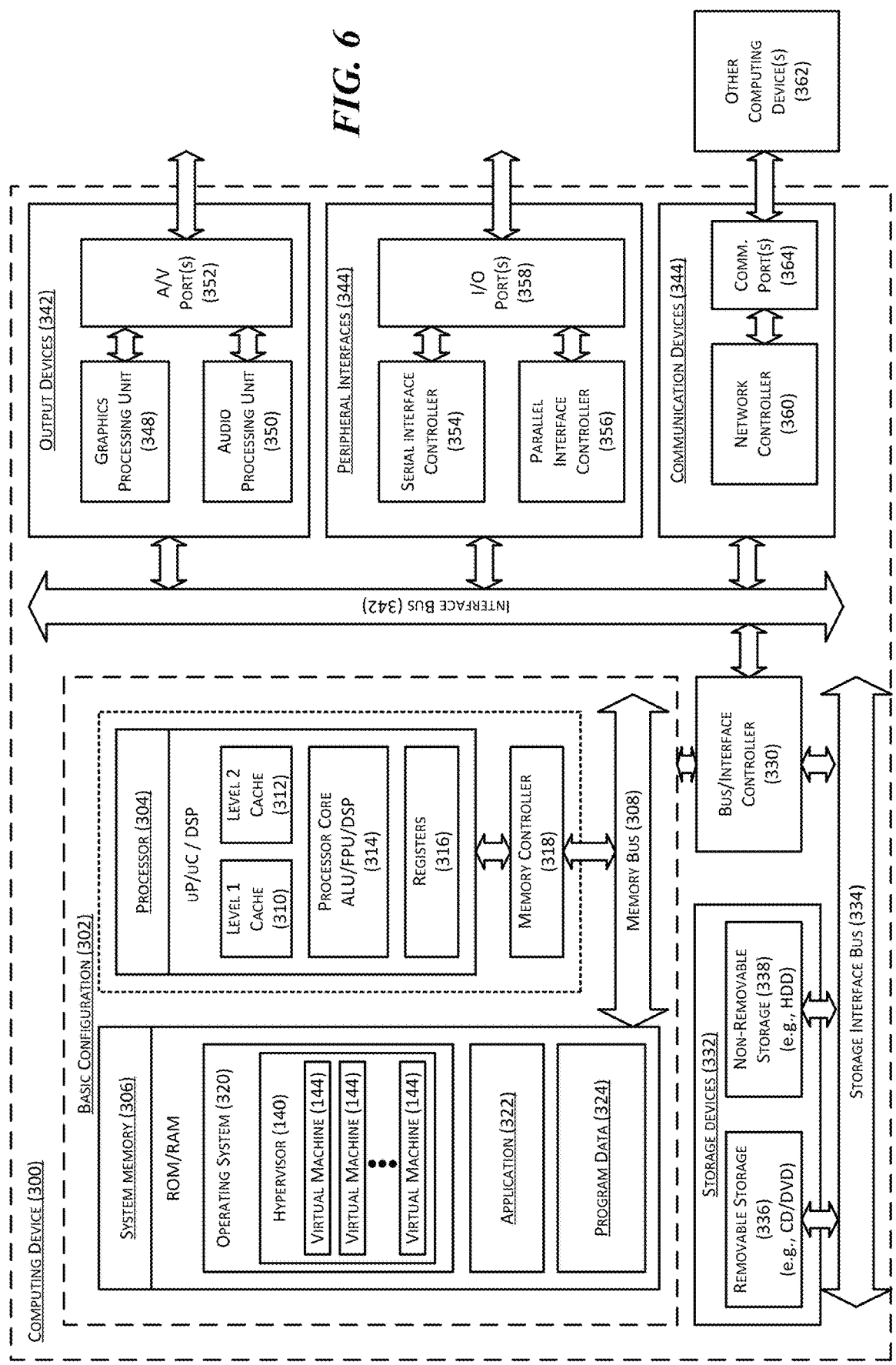

PACKET LEVEL REDUNDANCY IN DISTRIBUTED COMPUTING SYSTEMS

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In datacenters or other large-scale distributed computing systems, computing resources such as virtual machines or containers can be provisioned to provide latency-sensitive computing services. For instance, a virtual machine of a stock exchange can execute an application to provide a computing service that monitors stock trading and distribute stock price data to multiple users subscribing to the computing service. As such, the virtual machine can be configured to continuously, upon event (e.g., detection of a trade), or periodically transmit stock price data to other virtual machines or containers in the distributed computing system via a computer network. The other virtual machines or containers can then surface the received stock price data to users for consumption and action. In the foregoing scenario, the stock prices in the stock exchange can fluctuate constantly. Thus, excessive latency of transmitting such stock price data in the computer network may not be tolerated.

It is believed that two factors may affect transmission latency in a computer network. First, a network path may be congested to cause high latency when the transmission capacity along the network path is depleted. Such network congestion can be adequately addressed using network traffic engineering and other suitable techniques. Secondly, hardware faults in the computer network can also cause high transmission latency. For example, hardware faults, such as fiber optic cable cuts, relay/transceiver faults, or other hardware issues can cause data errors such as bits of transmitted packets being flip-flopped at a rate of about 1 out of $10^6$ packets. Though packets with data errors can be resent to correct the data errors, resending the packets can significantly increase transmission latency in the computer network. Currently, to address the hardware faults, a network operator may have to replace relays, transceivers, fiber optic cables, or other hardware components along the affected network paths in the computer network. Such replacement, however, can be costly and time consuming.

Several embodiments of the disclosed technology can address certain aspects of the foregoing difficulties by implementing a packet processor that performs packet level redundancy between pairs of source and destination nodes in a computer network. In certain implementations, the packet processor can be implemented as a part of a software driver for a Network Interface Card ("NIC") that is configured to transmit packets to the computer network. In other implementations, the packet processor can be a part of an operating system on a server, a stand alone application, hardware logic on the NIC or a NIC co-processor, or can have other suitable configurations.

In certain embodiments, a packet processor implemented as a part of the driver of the NIC can include a duplicator, a header manipulator, and a de-duplicator operatively coupled to one another. The duplicator can be configured to duplicate packets received from, for instance, an application executing on the server and to be transmitted via the NIC to a destination in the computer network. In certain implementations, the duplicator can be configured to monitor for any packets received from the application in a buffer accessible to the NIC. In response to detecting one or more packets (referred to herein as "original packets") in the buffer, the duplicator can be configured to duplicate the received one or more packets by creating one or more additional copies of the one or more packets (referred to herein as "duplicated packets") in the same buffer, in a different buffer, or in other suitable storage locations. For instance, a set of packets 1-10 may be detected in the buffer, and the duplicator can duplicate the set of packets 1-10 into a corresponding set of packets 1'-10'. In other embodiments, the packet processor can also include an interface, a transmission, or other suitable modules in addition to or in lieu of the foregoing components.

Upon completion of duplicating the received one or more packets, the header manipulator can be configured to manipulate one or more header values of the original and duplicated packets such that the original and duplicated packets are transmitted via different network paths in the computer network. For example, in one embodiment, the header manipulator can be configured to encapsulate the original and duplicated packets with an outer header. Examples of the outer header can include General Routing Encapsulation (GRE) headers, Virtual Extensive Local Area Network (VXLAN), or other suitable types of headers. In other examples, the header manipulator can also be configured to modify header values of existing headers or otherwise manipulate header values of the original and duplicated packets.

The header manipulator can also be configured to assign different header values to the outer header such that routers, switches, or other network components in the computer network can route the original and duplicated packets via different network paths. For instance, when the original and duplicated packets are encapsulated using GRE headers, the header manipulator can be configured to assign original packets with a first key value (e.g., "A") while assigning the duplicated packets with a second key value (e.g., "B"). In another example, the header manipulator can be configured to assign original packets with a first sequence number (e.g., "1") while assigning the duplicated packets with a second sequence number (e.g., "2"). In further examples, the header manipulator can be configured to manipulate other suitable header values to distinguish the original and the duplicated packets. Upon completion of manipulating the header values, the packet processor can be configured to instruct the NIC to transmit both the original and the duplicated packets to the computer network.

Based on the different header values in the original and duplicated packets, routers, switches, or other network components in the computer network can route the original and duplicated packets via different network paths. For example, a router in the computer network can route the original packets via a first network path based on the first key value of "A" while routing the duplicated packets via a second network path based on the second key value of "B" toward the same destination in the computer network. As used herein, two network paths are different when the two network paths traverse through different sequences of network components. As such, by manipulating the header values of the original and duplicated packets, two copies of the same packets can be transmitted to the destination via different network paths.

At the destination, another copy of the packet processor can include a de-duplicator that is configured to de-duplicate the received original and duplicated packets. In certain embodiments, the de-duplicator can be configured to implement a hash table for de-duplication. For example, during operation, when a first packet (e.g., original packet 1) is received, the de-duplicator can be configured to decapsulate the outer header of the first packet and derive a hash value of one or more header values (e.g., a source address, a destination address, a source port, a destination port, a protocol, etc.) of an inner header of the first packet. The derived hash value of the first packet is then stored in the hash table.

Subsequently, when a second packet (e.g., duplicated packet 1') is received, the de-duplicator can decapsulate the outer header of the second packet and derive another hash value of the one or more header values. The de-duplicator can then compare the hash value of the second packet with those in the hash table. In the example above, the hash value of the second packet is the same as that of the first packet because duplicated packet 1' is a copy of original packet 1. As such, the de-duplicator can be configured to (1) remove the hash value of the first packet from the hash table; and (2) discard the received second packet because the second packet is a duplicated copy of the first packet. On the other hand, when the hash value of the second packet does not match any hash values in the hash table, the de-duplicator can be configured to (1) add the hash value of the second packet to the hash table; (2) retain the second packet; and (3) periodically purge the hash table based on, for instance, a threshold time. In other embodiments, the de-duplicator can de-duplicate the original and duplicated packets using Bloom filter or other suitable de-duplicator techniques.

Serval embodiments of the disclosed packet level duplication technique can reduce risks of data error or packet loss due to hardware faults in the computer network. For instance, in the example above, if original packet 2 in ten of the original packets is lost due to hardware faults along a first network path, the de-duplicator at the destination can still receive a duplicate copy of the original packet 2 by retaining the duplicated packet 2" transmitted via the second network path. As discussed above, it is estimated that the risk of packet loss due to hardware faults is about 1 out of $10^6$ packets. By transmitting two copies of the same packet via two different network paths, the risk of packet loss due to hardware faults is about 1 out of $10^{12}$ packets, which is significantly lower than 1 out of $10^6$ packets. Thus, latency issues caused by hardware faults in the computer network can be reduced.

BRIEF DESCRIPTION OF THE DRAWINGS

FIG. 6 is a computing device suitable for certain components of the distributed computing system in FIG. 1.

DETAILED DESCRIPTION

Figure 1:
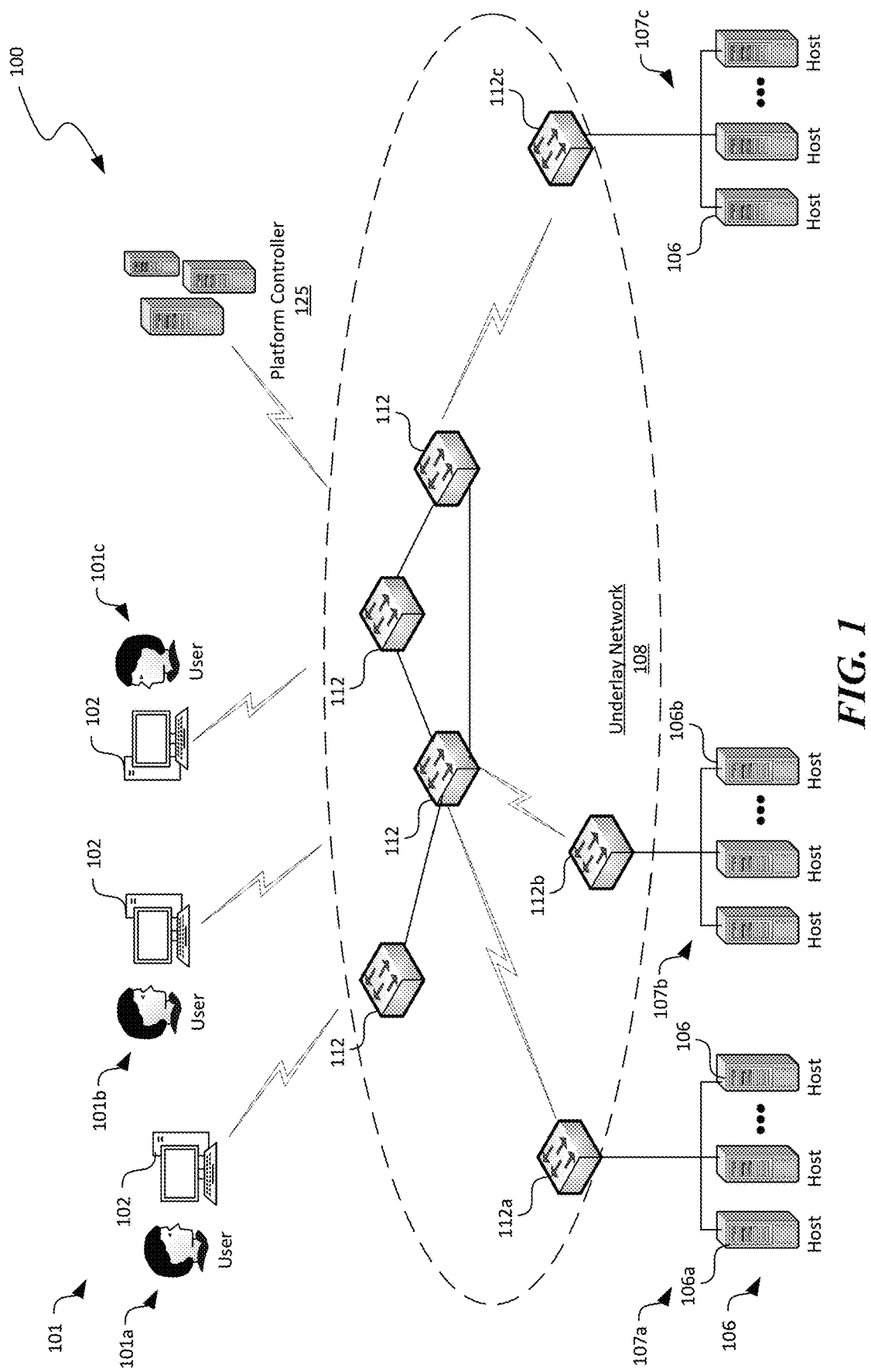
FIG. 1 is a schematic diagram illustrating a distributed computing system implementing packet level redundancy in accordance with embodiments of the disclosed technology.

Certain embodiments of systems, devices, components, modules, routines, data structures, and processes for packet level redundancy in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network. In other implementations, a computer network can only include the underlay network.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. In accordance with embodiments of the disclosed technology, the control data can also include a delivery time field configured to contain data of a delivery time at which a packet or a payload of the packet is allowed to be forwarded to a final destination, as described in more detail herein. Typically, the control data can be contained in headers and/or trailers of a packet. The headers and trailers can include one or more data field containing suitable information. An example data schema for control data is described in more detail below with reference to FIGS. 4A-4B.

FIG. 1 is a schematic diagram illustrating a distributed computing system 100 implementing packet level redundancy in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topologies. The underlay network 108 can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate virtual machines 144 (or container and other suitable resources) in the distributed computing system 100, monitor operations of the allocated virtual machines 144, or terminate any allocated virtual machines 144 once operations are complete. In another example, the platform controller 125 can be configured to maintain and provide access to a platform system time. In a further example, the platform controller 125 can facilitate synchronization of local system time on the individual hosts 106 according to the Network Time Protocol or other suitable protocols. In the illustrated implementation, the platform controller 125 is shown as an independent hardware/software component of the distributed computing system 100. In other embodiments, the platform controller 125 can also be a datacenter controller, a fabric controller, or other suitable types of controllers or a component thereof implemented as a computing service on one or more of the hosts 106.

Figure 2:
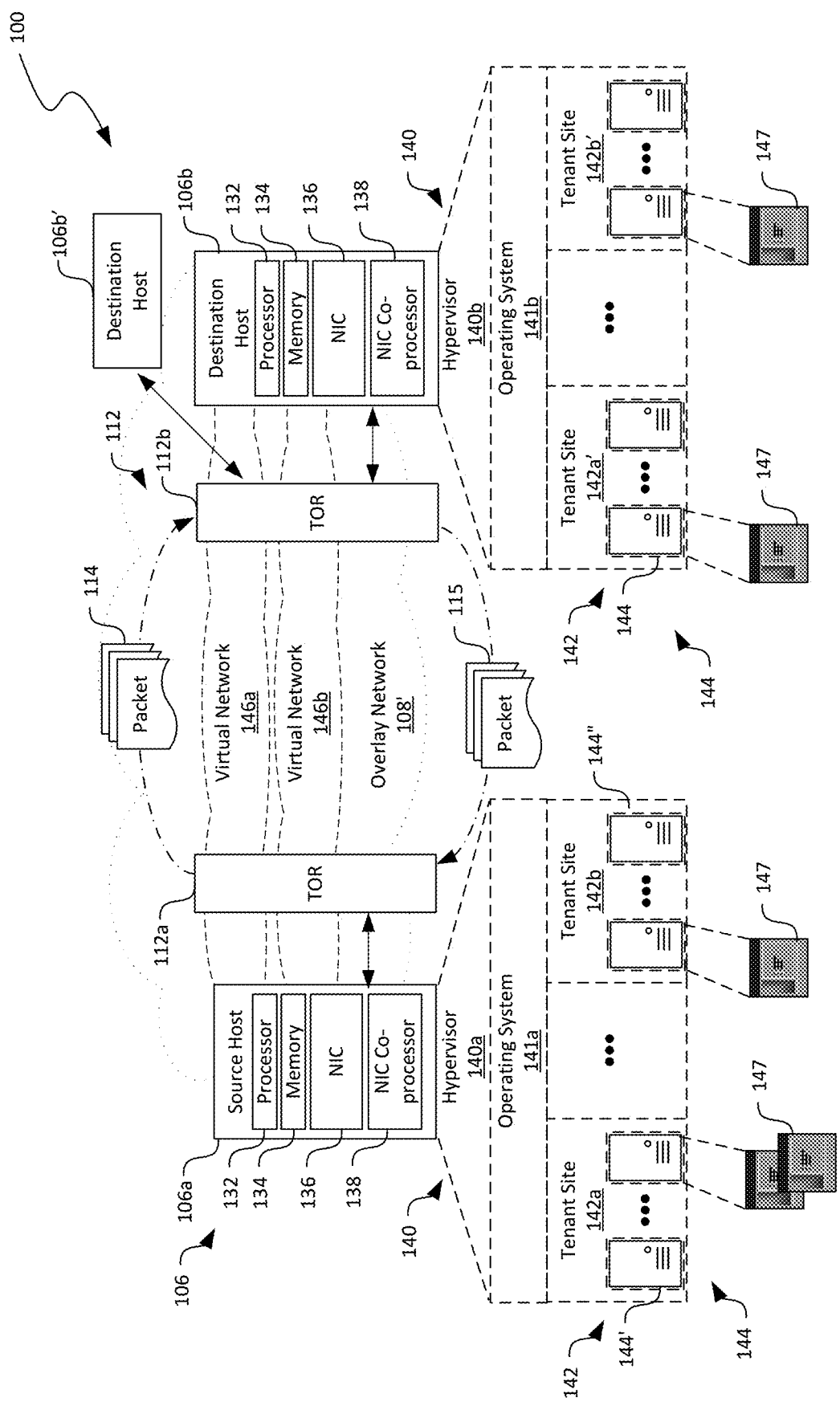
FIG. 2 is a schematic diagram illustrating certain hardware/software components of the distributed computing system of FIG. 1 in accordance with embodiments of the disclosed technology.

FIG. 2 is a schematic diagram illustrating details of certain hardware and software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the source host 106a and the destination hosts 106b and 106b' (only the destination hosts 106b is shown with detail components) can each include a processor 132, a memory 134, a network interface card 136, and a NIC co-processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM; magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5C). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The source host 106a and the destination host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisors 140 can individually be configured to generate, monitor, terminate, and/or otherwise manage one or more virtual machines 144 organized into tenant sites 142. For example, as shown in FIG. 2, the source host 106a can provide a first hypervisor 140a that manages first and second tenant sites 142a and 142b, respectively. The destination host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the source host 106a and the destination host 106b can both host the tenant site 142a and 142a' for a first tenant 101a (FIG. 1). The source host 106a and the destination host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the source host 106a and the destination host 106b. A second virtual network 146b interconnects the second tenant sites 142b and 142b' at the source host 106a and the destination host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). For example, the source host 106a can execute an application 147 that is configured to provide a computing service that monitors stock trading and distribute stock price data to multiple users 101 subscribing to the computing service. The virtual machines 144 on the virtual networks 146 can also communicate with one another via the underlay network 108 (FIG. 1) even though the virtual machines 144 are located on different hosts 106.

Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, virtual switches (not shown) can be configured to switch or filter packets 114 directed to different virtual machines 144 via the network interface card 136 and facilitated by the NIC co-processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a NIC co-processor 138 can be interconnected to and/or integrated with the NIC 136 to facilitate network traffic operations for enforcing communications security, performing network virtualization, translating network addresses, maintaining/limiting a communication flow state, or performing other suitable functions. In certain implementations, the NIC co-processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user 101 can configure logic blocks in FPGAs to perform complex combinational functions, or merely simple logic operations to synthesize equivalent functionality executable in hardware at much faster speeds than in software. In the illustrated embodiment, the NIC co-processor 138 has one interface communicatively coupled to the NIC 136 and another coupled to a network switch (e.g., a Top-of-Rack or "TOR" switch) at the other. In other embodiments, the NIC co-processor 138 can also include an Application Specific Integrated Circuit ("ASIC"), a microprocessor, or other suitable hardware circuitry.

In operation, the processor 132 and/or a user 101 (FIG. 1) can configure logic circuits in the NIC co-processor 138 to perform complex combinational functions or simple logic operations to synthesize equivalent functionality executable in hardware at much faster speeds than in software. For example, the NIC co-processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the NIC co-processor 138 identifies an inbound/outbound packet as belonging to a particular flow, the NIC co-processor 138 can apply one or more corresponding policies in the flow table before forwarding the processed packet to the NIC 136 or TOR 112. For example, as shown in FIG. 2, the application 147, the virtual machine 144, and/or other suitable software components on the source host 106a can generate an outbound packet 114 destined to, for instance, other applications 147 at the destination hosts 106b and 106b'. The NIC 136 at the source host 106a can forward the generated packet 114 to the NIC co-processor 138 for processing according to certain policies in a flow table. Once processed, the NIC co-processor 138 can forward the outbound packet 114 to the first TOR 112a, which in turn forwards the packet to the second TOR 112b via the overlay/underlay network 108 and 108'.

The second TOR 112b can then forward the packet 114 to the NIC co-processor 138 at the destination hosts 106b and 106b' to be processed according to other policies in another flow table at the destination hosts 106b and 106b'. If the NIC co-processor 138 cannot identify a packet as belonging to any flow, the NIC co-processor 138 can forward the packet to the processor 132 via the NIC 136 for exception processing. In another example, when the first TOR 112a receives an inbound packet 115, for instance, from the destination host 106b via the second TOR 112b, the first TOR 112a can forward the packet 115 to the NIC co-processor 138 to be processed according to a policy associated with a flow of the packet 115. The NIC co-processor 138 can then forward the processed packet 115 to the NIC 136 to be forwarded to, for instance, the application 147 or the virtual machine 144.

In the distributed computing system 100, packets 114 and 115 transmitted between the source host 106a and the destination host 106b can experience hardware faults in the underlay network 108 (FIG. 1). For example, hardware faults, such as fiber optic cable cuts, relay/transceiver faults, or other hardware issues can cause data errors such as bits of transmitted packets being flip-flopped at a rate of about 1 out of $10^6$ packets. Though packets 114 and 115 with data errors can be resent to correct the data errors, resending the packets 114 and 115 can significantly increase transmission latency in the underlay network 108. Currently, to address the hardware faults, a network operator may have to replace relays, transceivers, fiber optic cables, or other hardware components along the affected network paths in the underlay network 108. Such replacement, however, can be costly and time consuming.

Several embodiments of the disclosed technology can address certain aspects of the foregoing difficulties by implementing packet level redundancy in the distributed computing system 100. In certain implementations, packets 114 can be duplicated at the operating system 141a at the source node 106a, a software NIC driver 150 (shown in FIG. 3A) of the NIC 136, the NIC 136, or the NIC co-processor 138. The original and duplicated packets 114 can then be forced to be transmitted via different network paths in the underlay network 108 by manipulating header values of the original and duplicated packets 114. At the destination node 106b, the transmitted original and duplicated packets 114 can be de-duplicated, as described in more detail below with reference to FIGS. 3A-5.

Figure 3A:
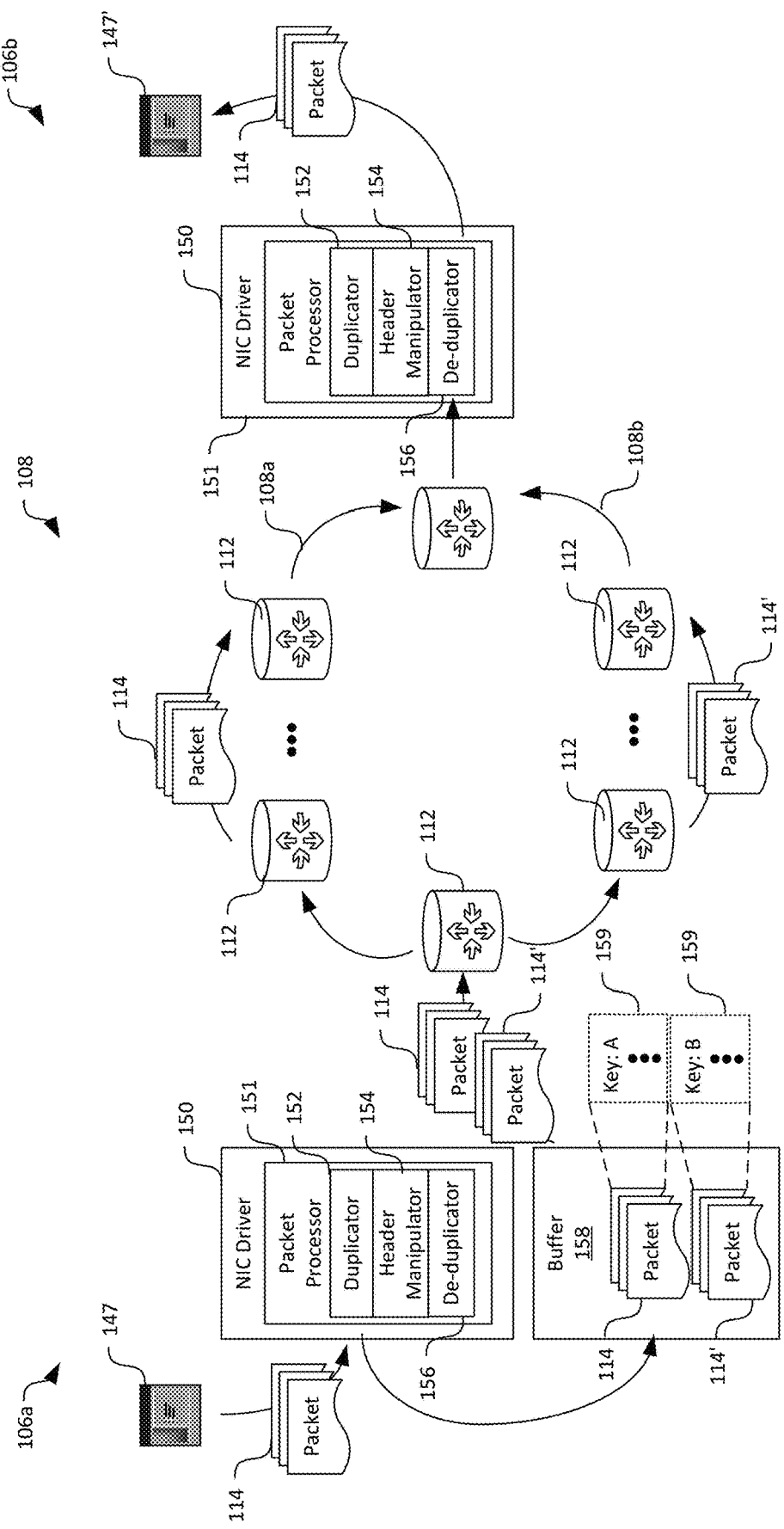
FIGS. 3A-3D are schematic diagrams illustrating certain example operations of packet level redundancy in a distributed computing system in accordance with embodiments of the disclosed technology.
Figure 3B:
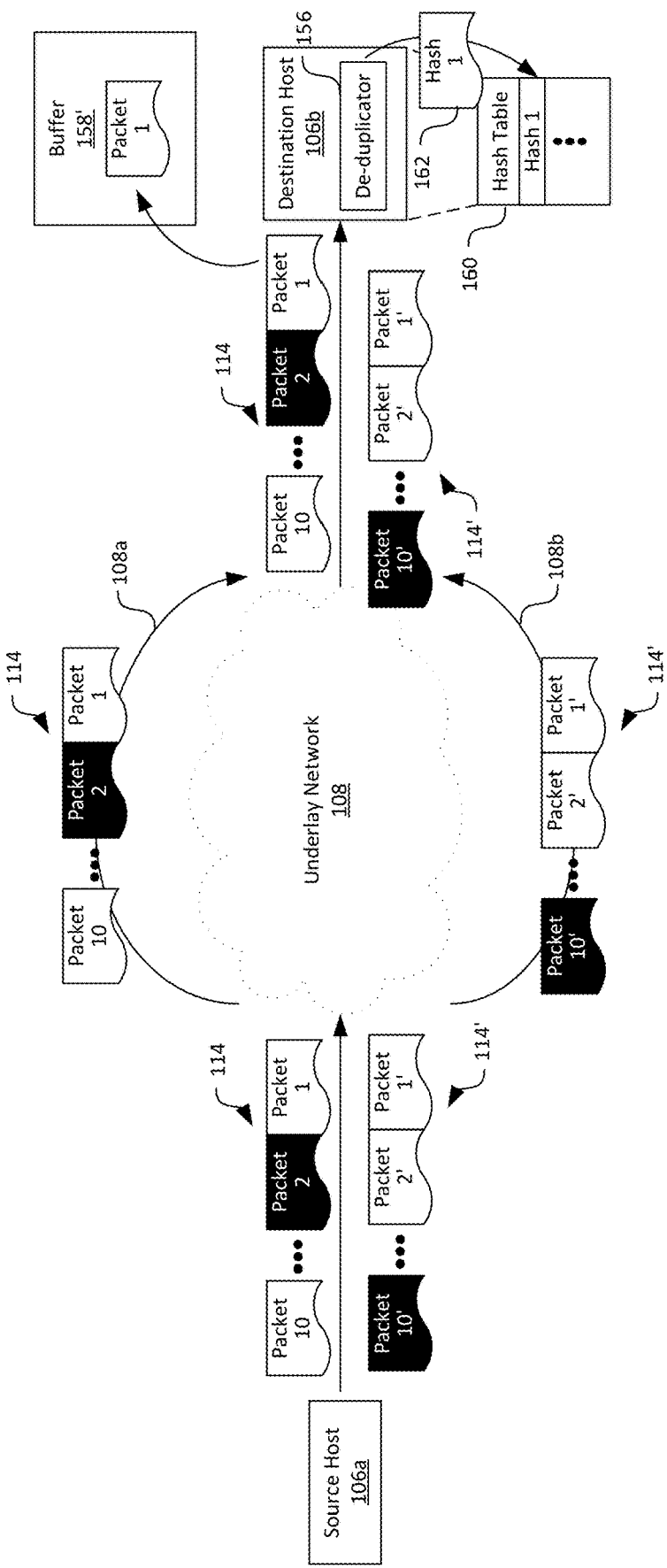

FIG. 3A-3D are schematic diagrams illustrating certain example operations of packet level redundancy in the distributed computing system 100 in accordance with embodiments of the disclosed technology. As shown in FIG. 3A, a NIC driver 150 at the source and destination hosts 106a and 106b can individually include a packet processor 151 configured to implement packet level redundancy. Though the packet processor 151 is shown in FIGS. 3A-3D as a part of the NIC driver 150, in other embodiments, one or more components of the packet processor 151 can also be implemented in the operating system 141 (FIG. 2), the NIC co-processor 138 (FIG. 2), as a standalone application, or can have other suitable configurations.

As shown in FIG. 3A, the packet processor 151 can include a duplicator 152, a header manipulator 154, and a de-duplicator 156 operatively coupled to one another. The duplicator 152 can be configured to duplicate packets 114 received from, for instance, an application 147 executing on the source host 106a and to be transmitted via the NIC 136 (FIG. 2) to another application 147 executing at the destination host 106b. In certain implementations, the duplicator 152 can be configured to monitor for any packets 114 received from the application in a buffer 158 accessible to the NIC 138. In response to detecting one or more packets 114 (referred to herein as "original packets") in the buffer 158, the duplicator 152 can be configured to duplicate the received one or more packets 114 by creating one or more additional copies of the one or more packets 114' (referred to herein as "duplicated packets") in the same buffer 158, in a different buffer (not shown), or in other suitable storage locations. For instance, a set of packets 1-10 may be detected in the buffer, and the duplicator 152 can duplicate the set of packets 1-10 (shown in FIG. 3B) into a set of corresponding packets 1'-10' (shown in FIG. 3B). In other embodiments, the packet processor 151 can also include an interface, a transmission, or other suitable modules in addition to or in lieu of the foregoing components.

Upon completion of duplicating the received one or more packets 114, the header manipulator 154 can be configured to manipulate one or more header values of the original and duplicated packets 114 and 114' such that the original and duplicated packets 114 and 114' are transmitted via different network paths in the underlay network 108. For example, in one embodiment, the header manipulator 156 can be configured to encapsulate the original and duplicated packets 114 and 114' with an outer header 159. Examples of the outer header 159 can include General Routing Encapsulation (GRE) headers, Virtual Extensive Local Area Network (VXLAN), or other suitable types of headers. In other examples, the header manipulator 156 can also be configured to modify header values of existing headers (not shown) or otherwise manipulate header values of the original and duplicated packets 114 and 114'.

The header manipulator 156 can also be configured to assign different header values to the outer header 159 such that routers, switches, or other network components 112 in the underlay network 108 can route the original and duplicated packets 114 and 114' via different network paths. For instance, as shown in FIG. 3A, when the original and duplicated packets 114 and 114' are encapsulated using GRE headers, the header manipulator 156 can be configured to assign original packets 114 with a first key value (e.g., "A") while assigning the duplicated packets with a second key value (e.g., "B"). In another example, the header manipulator 156 can be configured to assign original packets 114 with a first sequence number (e.g., "1") while assigning the duplicated packets 114' with a second sequence number (e.g., "2"). In further examples, the header manipulator 156 can be configured to manipulate other suitable header values to distinguish the original and the duplicated packets 114 and 114'. Upon completion of manipulating the header values, the packet processor 151 can be configured to instruct the NIC 138 to transmit both the original and the duplicated packets 114 and 114' to the destination host 106b via the underlay network 108.

Based on the different header values in the original and duplicated packets 114 and 114', routers, switches, or other network components in the underlay network 108 can route the original and duplicated packets 114 and 114' via different network paths. For example, as shown in FIG. 3A, a router 112 in the underlay network 108 can route the original packets 114 via a first network path 108a based on the first key value of "A" while routing the duplicated packets 114' via a second network path 108b based on the second key value of "B" toward the same destination host 106b. As such, by manipulating the header values of the original and duplicated packets 114 and 114', two copies of the same packets 114 and 114' can be transmitted to the destination host 106b via different first and second network paths 108a and 108b.

At the destination host 106b, another packet processor 151 can include a de-duplicator 156 that is configured to de-duplicate the received original and duplicated packets 114 and 114'. In certain embodiments, the de-duplicator 156 can be configured to implement a hash table 160 for de-duplication. For example, during operation, when a first packet 114 (e.g., original packet 1) is received, the de-duplicator 156 can be configured to decapsulate the outer header 159 (FIG. 3A) of the first packet 114 and derive a first hash value 162 (shown as "Hash 1") of one or more header values (e.g., a source address, a destination address, a source port, a destination port, a protocol, etc.) of an inner header of the first packet 114. The de-duplicator 156 can then determine whether the derived hash value 162 is in the hash table 160. In response to determining that the derived hash value 162 is not in the hash table, the de-duplicator 156 stores the hash value 162 of the first packet 114 in the hash table 160 as "Hash 1" and hold the first packet 114 in a buffer 158' for temporary storage.

Figure 3C:
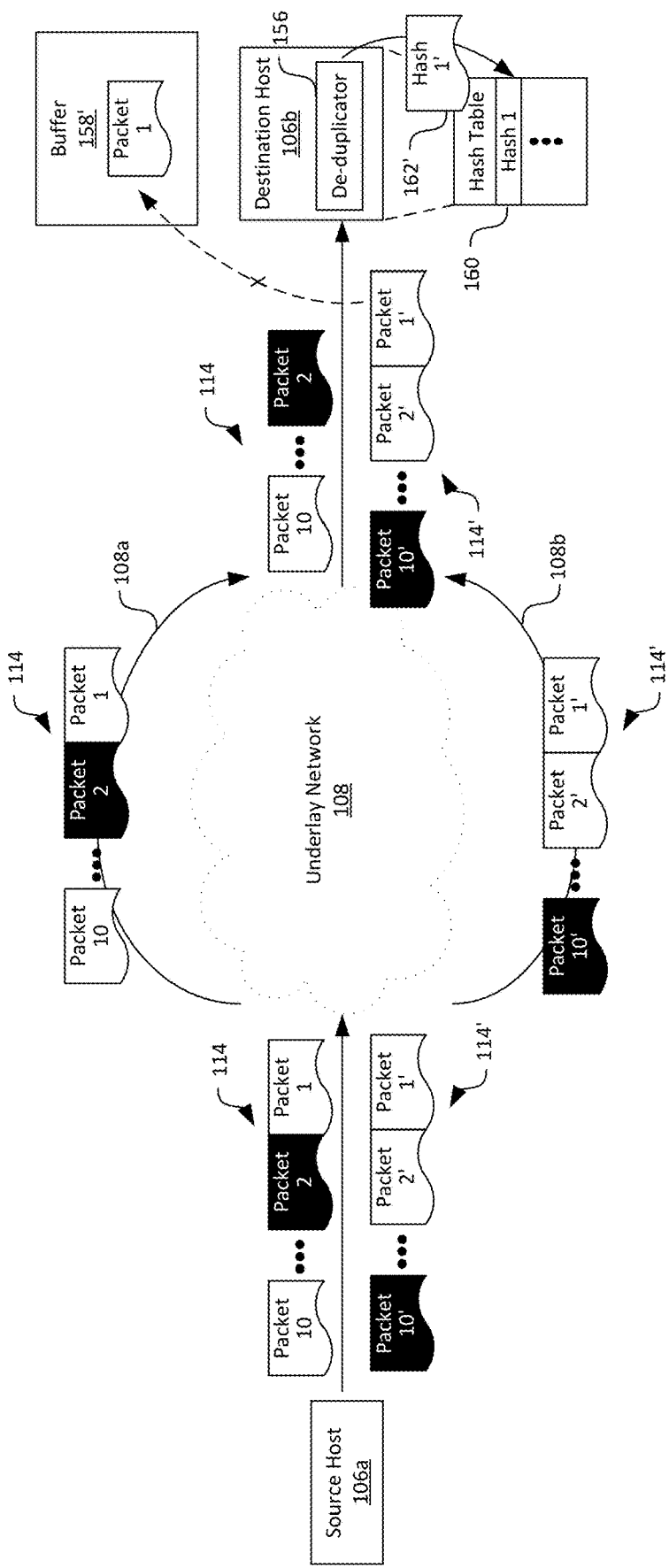

Subsequently, as shown in FIG. 3C, when a second packet 114' (e.g., duplicated packet 1') is received, the de-duplicator 156 can decapsulate the outer header 139 of the second packet 114' and derive a second hash value 162' of the one or more header values (shown as "Hash 1"). The de-duplicator 156 can then compare the second hash value 162' of the second packet 114' with those in the hash table 160. In the example above, the second hash value 162' of the second packet 114' is the same as that of the first packet 114 because duplicated packet 1' is a copy of original packet 1. As such, the de-duplicator 156 can be configured to (1) remove the hash value "Hash 1" of the first packet 114 from the hash table 160; and (2) discard the received second packet 114' because the second packet 114' is a duplicated copy of the already received first packet 114.

Figure 3D:
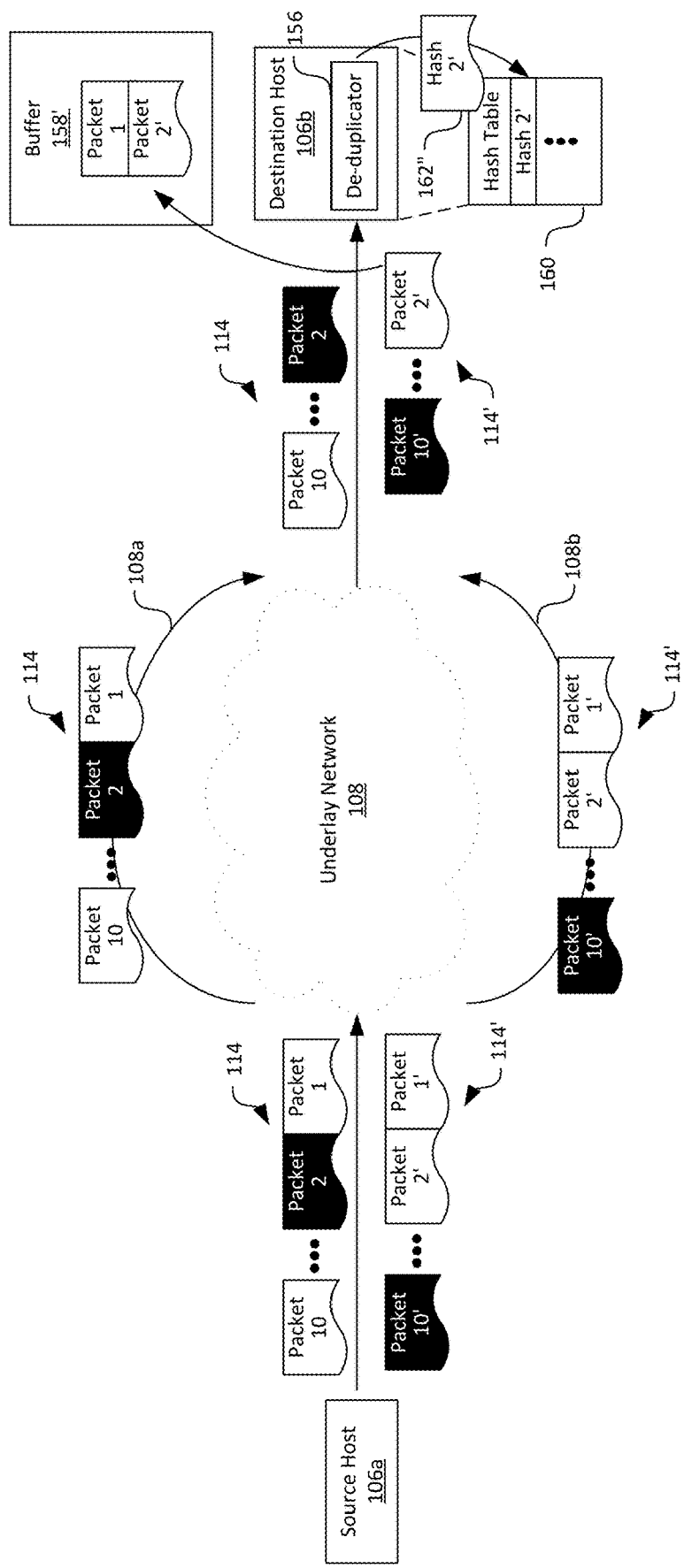

On the other hand, when the hash value of a subsequent packet does not match any hash values 162 in the hash table 160, the de-duplicator 156 can be configured to (1) add the hash value of the subsequent packet to the hash table; (2) retain the packet; and (3) periodically purge the hash table 160 based on, for instance, a threshold time. For example, as shown in FIG. 3D, Packet 2 of the original packets 114 may be lost or have data errors (shown in reverse contrast). As such, when the de-duplicator 156 receives Packet 2' in the duplicated packets 114', the de-duplicator 156 would not find a hash value 162 in the hash table 160 that matches the hash value 162" of Packet 2. Thus, the de-duplicator 156 can be configured to add "Hash 2" to the hash table 160 and retain Packet 2' in the buffer 158'. In other embodiments, the de-duplicator 156 can be configured to de-duplicate the original and duplicated packets 114 and 114' using Bloom filter or other suitable de-duplicator techniques.

Serval embodiments of the disclosed packet level redundancy technique can reduce risks of data error or packet loss due to hardware faults in the underlay network 108. For instance, in the example above, if original packet 2 in the original packets 114 and duplicated packet 10 in the duplicated packets 114' are lost due to hardware faults along the first and second network paths 108a and 108b, respectively, the de-duplicator 156 at the destination host 106b can still construct a complete copy of the original packets 114 by retaining copies of the packets from the original and duplicated packets 114 and 114'. As discussed above, it is estimated that the risk of packet loss due to hardware faults is about 1 out of $10^6$ packets. By transmitting two copies of the same packet via two different network paths, the risk of packet loss due to hardware faults is about 1 out of $10^{12}$ packets, which is significantly lower than 1 out of $10^6$ packets. Thus, latency issues caused by hardware faults in the underlay network 108 can be reduced.

Figure 4A:
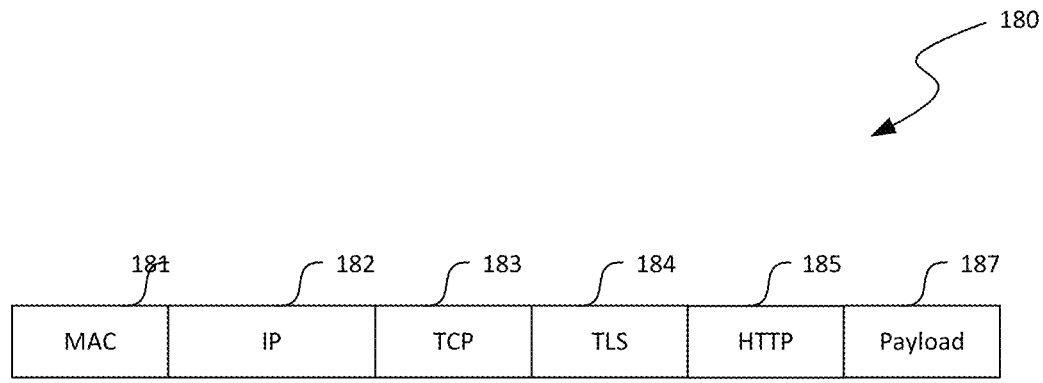
FIGS. 4A and 4B illustrate an example data schema for a packet header suitable for implementing packet level redundancy in accordance with embodiments of the disclosed technology.

FIG. 4A is a schematic diagram illustrating a data schema 180 suitable for a packet header in accordance with embodiments of the disclosed technology. As shown in FIG. 4A, the data schema 180 can include a MAC field 181, an IP field 182, a TCP field 183, a TLS field 184, and an HTTP field 185. The MAC field 181, the IP field 182, and the TCP field 183 can be configured to contain a MAC address, an IP address, and a port number of the NIC 136 (FIG. 2) and/or the host 106 (FIG. 2), respectively. In certain embodiments, the IP field 182 can also include a delivery time field 186 (shown in FIG. 4B) configured to contain a delivery time. In other embodiments, the delivery time field 186 can also be an encapsulating layer header in the data schema. The TLS field 184 can be configured to contain a value indicating a type of data contained in the packet. Example values for the TLS field 184 can include APPLICATION_DATA, CHANGE_CIPHER_SPEC, ALERT, or HANDSHAKE.

The HTTP field 185 can be configured to contain various parameters according to the HTTP protocol. For example, the parameters can include a content length of the data in the data field, cache control, etc. Example header fields of the IP field 182 are described in more detail with reference to FIG. 4B. Even though the example data schema 180 includes the HTTP field 185, in other embodiments, the data schema 180 can include Secure Shell, Secure Copy, Secure FTP, or other suitable header fields.

Figure 4B:
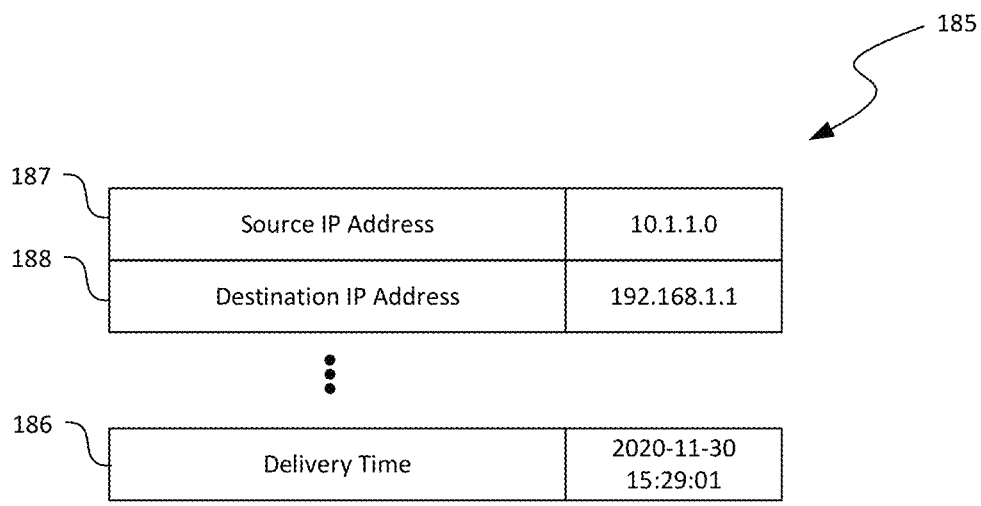

FIG. 4B is a schematic diagram illustrating example header fields suitable for the IP field 182 in FIG. 4A in accordance with embodiments of the disclosed technology. As shown in FIG. 4B, the header fields can include a source IP address field 187, a destination IP address field 188, and a delivery time field 186 containing example IP addresses and a delivery time, respectively. Though particular fields are shown in FIG. 4B as examples, in other embodiments, the IP header 182 can also include additional and/or different fields configured to contain other suitable parameters in addition to those shown in FIG. 4B.

Figure 5A:
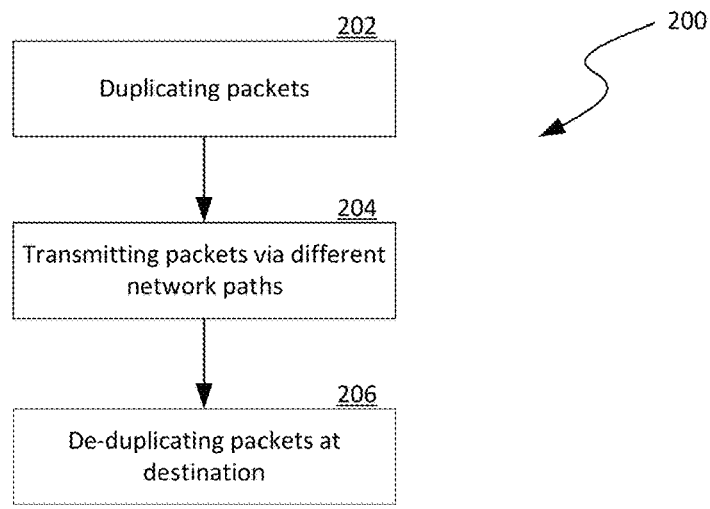
FIGS. 5A-5C are flowcharts illustrating various processes for time-sensitive data delivery in a distributed computing system in accordance with embodiments of the disclosed technology.
Figure 5B:
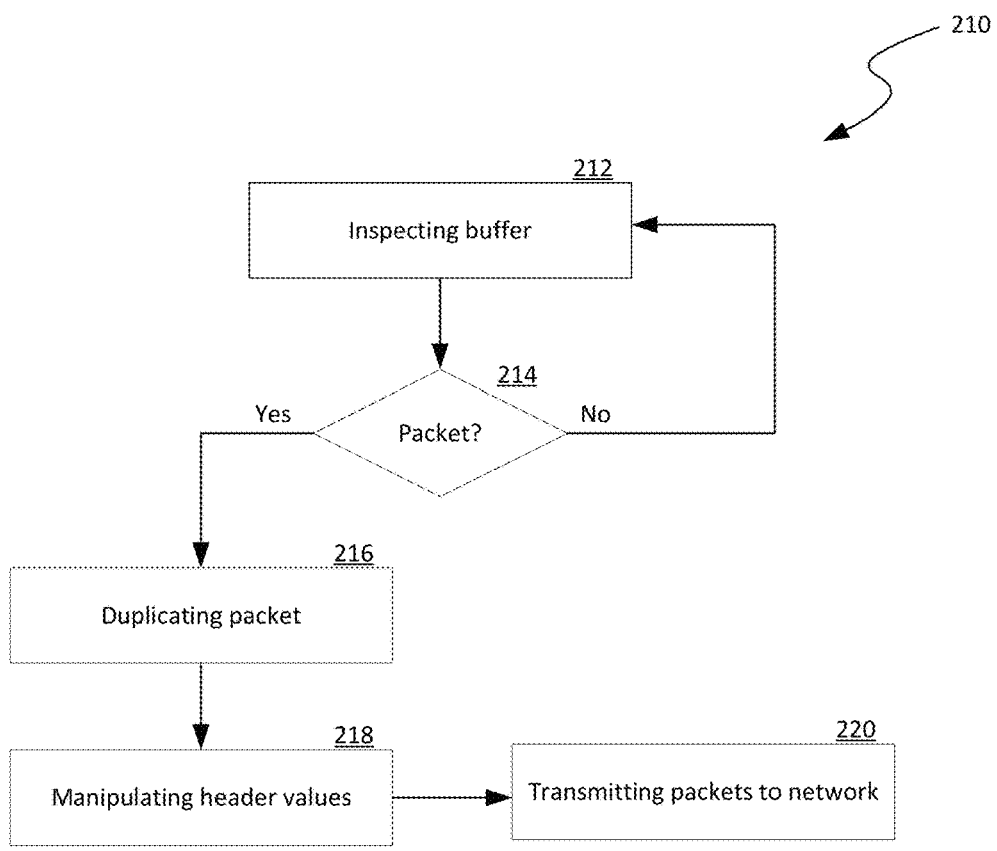
Figure 5C:
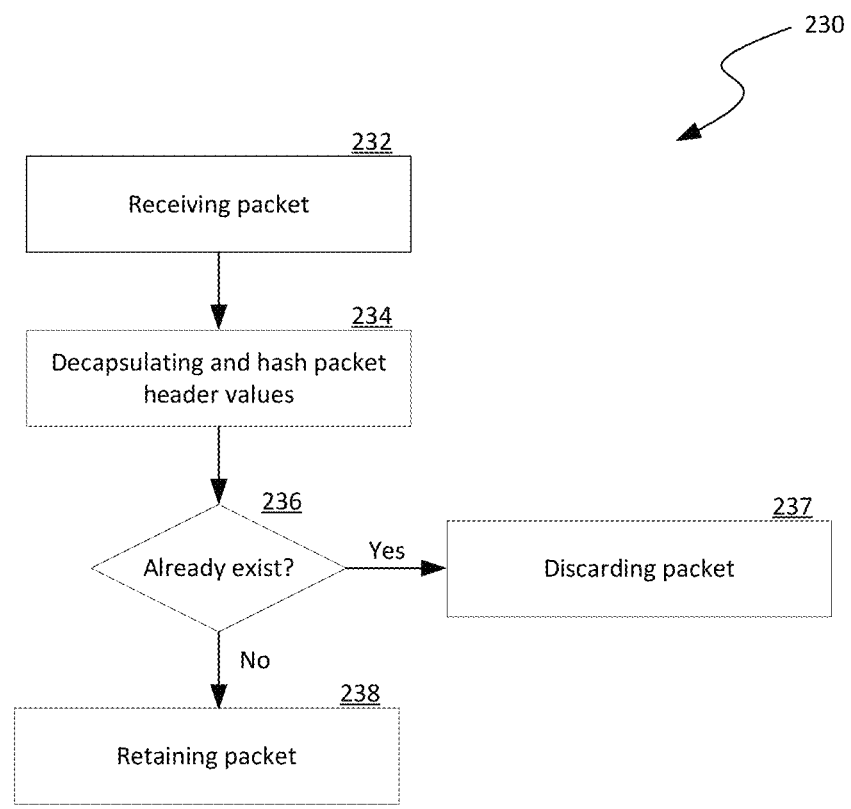

FIGS. 5A-5C are flowcharts illustrating processes for implementing packet level redundancy in accordance with embodiments of the disclosed technology. Though the processes are described below considering the distributed computing system 100 of FIGS. 1-3D, in other embodiments, the processes can also be performed in other computing systems with similar or different components.

As shown in FIG. 5A, a process 200 can include duplicating packets to be transmitted from a source host to a destination host at stage 202. In one embodiment, one additional copy of the packets can be replicated. In other embodiments, two, three, or any other suitable numbers of copies of the packets can be replicated. The process 200 can then include transmitting the original and duplicated packets from the source host to the destination host via different network paths at stage 204. In certain embodiments, transmitting the packets via different network paths can be achieved by manipulating certain header values of the original and duplicated packets. In other embodiments, transmitting the packets via different network paths can be achieved in other suitable manners. Example operations of transmitting the packets via different network paths are described below with reference to FIG. 5B. The process 200 can then include de-duplicating the original and duplicated packets received at the destination host at stage 206. Example operations of de-duplicating the packets are described in more detail below with reference to FIG. 5C.

As shown in FIG. 5B, example operations of transmitting the packets via different network paths can include inspecting a buffer for packets to be transmitted at stage 212. The operations can then include a decision stage 214 to determine whether one or more packets are detected in the buffer. In response to determining that one or more packets are not detected, the operations revert to inspecting the buffer at stage 212. Otherwise, the operations proceed to duplicating the one or more packets at stage 216. The operations can then include manipulating header values of the original and duplicated packets at stage 218 before transmitting the original and duplicated packets to the network at stage 220.

As shown in FIG. 5C, example operations of de-duplicating packets can include receiving a packet at stage 232. The operations can then include decapsulating the received packet and deriving a hash value of one or more header values of the decapsulated packet at stage 234. The operations can the include a decision stage 236 to determine whether the derived hash value already exists in a hash table. In response to determining that the derived hash value already exists in the hash table, the operations proceed to discarding the received packet and remove the hash value from the hash table at stage 237. Otherwise, the operations include retaining the packet and write the derived hash value into the hash table at stage 238.

FIG. 6 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (UP), a microcontroller (C), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for packet level redundancy in a distributed computing system having a plurality of hosts interconnected by a computer network, the method comprising:

receiving, at a source host in the distributed computing system, an original packet to be transmitted to an application executing at a destination host in the distributed computing system via the computer network; and in response to receiving the original packet, at the source host,
  generating a duplicated packet based on the received original packet, the duplicated packet being a copy of the received original packet;
  encapsulating the original and duplicated packets with first and second outer headers having first and second header values, respectively, the first and second header values being different from each other;
  transmitting the original packet from the source host to the destination host via a first network path in the computer network according to the first header value, wherein transmitting the original packet from the source host to the destination host via the first network path in the computer network includes determining the first network path according to the first header value based on a routing table at a network component in the computer network; and
  transmitting the duplicated packet from the source host to the destination host via a second network path in the computer network according to the second header value, the second network path being different from the first network path, wherein transmitting the duplicated packet from the source host to the destination host via the second network path in the computer network includes determining the second network path according to the second header value based on the same routing table at the same network component in the computer network.

2. The method of claim 1, further comprising:

receiving, at the destination host, the transmitted original and duplicated packets via the first and second network paths, respectively; and upon receiving the original and duplicated packets,
  de-duplicating the received original and duplicated packets; and
  transmitting the de-duplicated original and duplicated packets to the application executing at the destination host.

3. The method of claim 1, further comprising:

receiving, at the destination host, the transmitted original or duplicated packet via the first and second network paths, respectively; and upon receiving the original or duplicated packet,
  decapsulating the original or duplicated packet to remove the outer header;
  deriving a hash value of one or more header values of the decapsulated original or duplicated packet;
  determining whether the derived hash value is in a hash table; and
  in response to determining that the derived hash value is not in the hash table,
    retaining the received original or duplicated packet; and
    adding the derived hash value to the hash table.

4. The method of claim 1, further comprising:

receiving, at the destination host, the transmitted original or duplicated packet via the first and second network paths, respectively; and upon receiving the original or duplicated packet,
  decapsulating the original or duplicated packet to remove the outer header;

deriving a hash value of one or more header values of the decapsulated original or duplicated packet;
determining whether the derived hash value is in a hash table; and
in response to determining that the derived hash value is not in the hash table,
retaining the received original or duplicated packet;
adding the derived hash value to the hash table; and
purging the derived hash value in the hash table after a threshold time.

5. The method of claim 1, further comprising:
receiving, at the destination host, the transmitted original or duplicated packet via the first and second network paths, respectively; and
upon receiving the original or duplicated packet,
decapsulating the original or duplicated packet to remove the outer header;
deriving a hash value of one or more header values of the decapsulated original or duplicated packet;
determining whether the derived hash value is in a hash table; and
in response to determining that the derived hash value is not in the hash table,
providing the received original or duplicated packet to the application executing at the destination host; and
adding the derived hash value to the hash table.

6. The method of claim 1, further comprising:
receiving, at the destination host, the transmitted original or duplicated packet via the first and second network paths, respectively; and
upon receiving the original or duplicated packet,
decapsulating the original or duplicated packet to remove the outer header;
deriving a hash value of one or more header values of the decapsulated original or duplicated packet;
determining whether the derived hash value is in a hash table; and
in response to determining that the derived hash value is already in the hash table, discarding the received original or duplicated packet.

7. The method of claim 1, further comprising:
receiving, at the destination host, the transmitted original or duplicated packet via the first and second network paths, respectively; and
upon receiving the original or duplicated packet,
decapsulating the original or duplicated packet to remove the outer header;
deriving a hash value of one or more header values of the decapsulated original or duplicated packet;
determining whether the derived hash value is in a hash table; and
in response to determining that the derived hash value is already in the hash table,
discarding the received original or duplicated packet; and
removing the derived hash value from the hash table.

8. The method of claim 1 wherein generating the duplicated packet is performed at one of:
an application executing at the source host;
an operating system at the source host;
a software driver of a Network Interface Card ("NIC") at the source host; or
a co-processor of the NIC.

9. A computing device connectable to other computing devices in a distributed computing system by a computer network, comprising:

a processor;
a network interface card ("NIC"); and
a memory containing instructions executable by the processor to cause the computing device to:
upon receiving, at a source host in the distributed computing system, an original packet to be transmitted to an application executing at a destination host in the distributed computing system via the computer network,
generate a duplicated packet based on the received original packet, the duplicated packet being a copy of the received original packet;
encapsulate the original and duplicated packets with first and second outer headers having first and second header values, respectively, the first and second header values being different from each other;
transmit the original packet from the source host to the destination host via a first network path in the computer network according to the first header value, wherein transmitting the original packet from the source host to the destination host via the first network path in the computer network includes determining the first network path according to the first header value based on a routing table at a network component in the computer network; and
transmit the duplicated packet from the source host to the destination host via a second network path in the computer network according to the second header value, the second network path being different from the first network path, wherein transmitting the duplicated packet from the source host to the destination host via the second network path in the computer network includes determining the second network path according to the second header value based on the same routing table at the same network component in the computer network.

10. The computing device of claim 9 wherein the memory includes additional instructions executable by the processor to cause the computing device to:
upon receiving, at the destination host, the transmitted original and duplicated packets via the first and second network paths, respectively, de-duplicate the received original and duplicated packets; and
transmit the de-duplicated original and duplicated packets to the application executing at the destination host.

11. The computing device of claim 9 wherein the memory includes additional instructions executable by the processor to cause the computing device to:
upon receiving, at the destination host, the transmitted original or duplicated packet via the first and second network paths, respectively,
decapsulate the original or duplicated packet to remove the outer header;
derive a hash value of one or more header values of the decapsulated original or duplicated packet;
determine whether the derived hash value is in a hash table; and
in response to determining that the derived hash value is not in the hash table,
retain the received original or duplicated packet; and
add the derived hash value to the hash table.

12. The computing device of claim 9 wherein the memory includes additional instructions executable by the processor to cause the computing device to:
upon receiving, at the destination host, the transmitted original or duplicated packet via the first and second network paths, respectively, decapsulate the original or duplicated packet to remove the outer header; derive a hash value of one or more header values of the decapsulated original or duplicated packet;
determine whether the derived hash value is in a hash table; and
in response to determining that the derived hash value is not in the hash table,
retain the received original or duplicated packet;
add the derived hash value to the hash table; and
purge the derived hash value in the hash table after a threshold time.

13. The computing device of claim 9 wherein the memory includes additional instructions executable by the processor to cause the computing device to:
upon receiving, at the destination host, the transmitted original or duplicated packet via the first and second network paths, respectively,
decapsulate the original or duplicated packet to remove the outer header;
derive a hash value of one or more header values of the decapsulated original or duplicated packet;
determine whether the derived hash value is in a hash table; and
in response to determining that the derived hash value is not in the hash table,
provide the received original or duplicated packet to the application executing at the destination host; and
add the derived hash value to the hash table.

14. The computing device of claim 9 wherein the memory includes additional instructions executable by the processor to cause the computing device to:
upon receiving, at the destination host, the transmitted original or duplicated packet via the first and second network paths, respectively,
decapsulate the original or duplicated packet to remove the outer header;
derive a hash value of one or more header values of the decapsulated original or duplicated packet;
determine whether the derived hash value is in a hash table; and
in response to determining that the derived hash value is already in the hash table, discard the received original or duplicated packet.

15. The computing device of claim 9 wherein the memory includes additional instructions executable by the processor to cause the computing device to:
upon receiving, at the destination host, the transmitted original or duplicated packet via the first and second network paths, respectively,
decapsulate the original or duplicated packet to remove the outer header;
derive a hash value of one or more header values of the decapsulated original or duplicated packet;
determine whether the derived hash value is in a hash table; and
in response to determining that the derived hash value is already in the hash table,
discard the received original or duplicated packet; and
remove the derived hash value from the hash table.

16. A method for packet level redundancy in a distributed computing system having a plurality of hosts interconnected by a computer network, the method comprising:
receiving, at a source host in the distributed computing system, an original packet to be transmitted to an application executing at a destination host in the distributed computing system via the computer network; and
in response to receiving the original packet, at the source host,
generating a duplicated packet based on the received original packet, the duplicated packet being a copy of the received original packet;
encapsulating the original and duplicated packets with first and second outer headers having first and second header values, respectively, the first and second header values being different from each other;
transmitting the original and the duplicated packets from the source host to the destination host via a first network path and a second network path in the computer network according to the first header value and the second header value, respectively, wherein transmitting the original packet from the source host to the destination host via the first network path in the computer network includes determining the first network path according to the first header value based on a routing table at a network component in the computer network, and wherein transmitting the duplicated packet from the source host to the destination host via the second network path in the computer network includes determining the second network path according to the second header value based on the same routing table at the same network component in the computer network; and
de-duplicating the transmitted original and duplicated packets at the destination host before providing the de-duplicated original and duplicated packets to the application executing at the destination host.

17. The method of claim 16, further comprising:
receiving, at the destination host, the transmitted original or duplicated packet via the first and second network paths, respectively; and
upon receiving the original or duplicated packet,
decapsulating the original or duplicated packet to remove the outer header;
deriving a hash value of one or more header values of the decapsulated original or duplicated packet;
determining whether the derived hash value is in a hash table; and
in response to determining that the derived hash value is not in the hash table,
retaining the received original or duplicated packet; and
adding the derived hash value to the hash table.

18. The method of claim 16, further comprising:
receiving, at the destination host, the transmitted original or duplicated packet via the first and second network paths, respectively; and
upon receiving the original or duplicated packet,
decapsulating the original or duplicated packet to remove the outer header;
deriving a hash value of one or more header values of the decapsulated original or duplicated packet;
determining whether the derived hash value is in a hash table; and
in response to determining that the derived hash value is not in the hash table, retaining the received original or duplicated packet;
adding the derived hash value to the hash table; and
purging the derived hash value in the hash table after a threshold time.

19. The method of claim 16, further comprising:
receiving, at the destination host, the transmitted original or duplicated packet via the first and second network paths, respectively; and
upon receiving the original or duplicated packet,
  decapsulating the original or duplicated packet to remove the outer header;
  deriving a hash value of one or more header values of the decapsulated original or duplicated packet;
  determining whether the derived hash value is in a hash table; and
  in response to determining that the derived hash value is not in the hash table,
    providing the received original or duplicated packet to the application executing at the destination host; and
adding the derived hash value to the hash table.

\* \* \* \* \*